(12) United States Patent
Honzek

(10) Patent No.: US 8,393,434 B2
(45) Date of Patent: Mar. 12, 2013

(54) STEERING SYSTEM FOR A UTILITY VEHICLE

(75) Inventor: Robert Honzek, Oberthingau (DE)

(73) Assignee: AGCO GmbH, Marktoberdorf (DE)

( * ) Notice: Subject to any disclaimer, the term of this patent is extended or adjusted under 35 U.S.C. 154(b) by 308 days.

(21) Appl. No.: 12/741,900

(22) PCT Filed: Oct. 27, 2008

(86) PCT No.: PCT/EP2008/009055
§ 371 (c)(1),
(2), (4) Date: Jul. 7, 2010

(87) PCT Pub. No.: WO2009/059707
PCT Pub. Date: May 14, 2009

(65) Prior Publication Data
US 2010/0270099 A1    Oct. 28, 2010

(30) Foreign Application Priority Data

Nov. 8, 2007  (DE) .......................... 10 2007 053 265
Nov. 8, 2007  (DE) .......................... 10 2007 053 322

(51) Int. Cl.
*B62D 5/06* (2006.01)
(52) U.S. Cl. ........................................ 180/440; 180/439

(58) Field of Classification Search .................. 180/439, 180/440
See application file for complete search history.

(56) References Cited

U.S. PATENT DOCUMENTS

| | | | |
|---|---|---|---|
| 3,805,910 A | | 4/1974 | Hull |
| 5,282,644 A | * | 2/1994 | Larson .......................... 280/638 |
| 7,025,168 B2 | * | 4/2006 | Wigdahl et al. ............... 180/436 |
| 7,331,419 B2 | | 2/2008 | Sikora et al. |

FOREIGN PATENT DOCUMENTS

| | | |
|---|---|---|
| DE | 298 04 359 | 11/1998 |
| FR | 2 205 875 | 5/1974 |
| GB | 2 275 662 | 9/1994 |
| GB | 2275662 A * | 9/1994 |

OTHER PUBLICATIONS

International Search Report for International Applicaiton No. PCT/EP2008/009055 Dated Feb. 17, 2009.

* cited by examiner

*Primary Examiner* — Tashiana Adams

(57) ABSTRACT

The invention relates to a steering system for a utility vehicle, wherein the steering movement is transmitted to the utility vehicle wheels via a steering linkage provided on a steering unit (16, 17; 77). The steering unit (16, 17; 77) is arranged so as to be displaceable along a guide unit (15) which is fixed relative to the utility vehicle. A displacing force upon the steering unit (16, 17; 77) may be provided by a hydraulic cylinder arrangement integrated into the steering unit and/or by a mechanical coupling to a steering wheel for example.

15 Claims, 12 Drawing Sheets

STEERING SYSTEM FOR A UTILITY VEHICLE

The invention relates to a steering system for a utility vehicle having at least one pair of steerable wheels.

A hydrostatic steering system is predominantly used in utility vehicles, such as tractors for example. This means that there is no direct mechanical connection between a steering wheel and the steering system for moving utility vehicle wheels. A steering cylinder is mechanically coupled to the utility wheels to be moved. In this case the steering movement of the steering wheel can be transmitted to the utility vehicle wheels for example by means of a steering cylinder piston rod, arranged in the steering cylinder, and a steering linkage. The steering movement of the utility vehicle wheels to be moved is controlled by means of a splitting unit coupled to the steering wheel. The splitting unit determines into which cylinder chamber of the steering cylinder and in which quantity a fluid, for example oil, is supplied.

The steering linkage is for example a track rod and a steering arm which are coupled to each other. Any component by means of which a displacement of the steering cylinder piston rod or another displaceable component of the steering system is transmitted into a movement of the utility vehicle wheels can also be regarded as a steering linkage.

Owing to the limited installation space in utility vehicles, because part of the frame obstructs a direct connection of the two steered wheels for example, the steering system can only be fitted in the utility vehicle in such a way that it can be coupled to the utility vehicle wheels by a crank at the ends of the steering cylinder piston rod or at the steering linkage. However this crank limits the transmission of steering forces to the utility vehicle wheels that occur during the steering movement, so use of the steering system for example in a tractor with dual tyres or triple tyres is not possible.

The object underlying the present invention accordingly consists in providing a steering system via which relatively large steering forces can be transmitted to the utility vehicle wheels during a steering movement.

According to the invention there is provided a steering system, comprising a steering unit through which a guide element extends, wherein the guide element is fixed in position relative to a frame of a vehicle and the steering unit can be displaced along the guide element, and wherein the steering unit can be coupled to utility vehicle wheels via a steering linkage.

The advantages achieved with the invention consist in particular in that a crank of the steering linkage or steering cylinder piston rod is no longer necessary due to an arrangement of the steering linkage directly on a steering unit. The steering system can therefore also be used in utility vehicles, such as a tractor with dual or triple tyres, in which relatively high steering forces act on the steering system. Consequently these steering forces are no longer transmitted to the steering linkage by a guide element, such as the steering cylinder piston rod for example, but by the steering unit. Owing to its larger surface relative to the steering cylinder piston rod the steering unit can transmit a greater steering force via the steering linkage to a wheel mounting unit on which the utility vehicle wheels are arranged.

The steering unit is preferably elongate and comprises legs toward its longitudinal ends. The guide element is preferably a shaft which extends transversely with respect to direction of travel of the vehicle and upon which the steering unit is slidably mounted. Each leg may be reinforced with a separate part which is preferably triangular to provide increased strength.

The legs advantageously serve to provide an attachment point for the steering linkage which is connected to the steerable wheel. The linkage may be simply coupled to a leg, or pair of legs, by a pin inserted through holes in the leg(s).

The steering unit may be L-shaped transversely to the guide element. Alternatively, and preferably, the steering unit may comprise at each end a pair of legs which each surround the guide unit in a U-shaped manner. Furthermore, the axial position of the steering linkage on the pin may be adjusted by means of a centring bush.

In accordance with the invention, the steering unit is slidably mounted on the guide element which preferably extends in a transverse direction as mentioned above. The mechanism which provides a displacing force on the steering unit may take various different forms.

In a first preferred embodiment, the steering unit comprises an integrated hydraulic cylinder arrangement having two cylinder chambers, wherein the steering unit is displaced in response to fluid supplied into the cylinder chambers. More specifically, the steering unit may comprise a centring unit and a control unit, wherein the centring unit and the control unit are separated by an intermediate element fastened to the steering unit, and the steering unit can be displaced in response to a quantity of fluid supplied into the centring unit and/or control unit. The installation space required for the steering system may be minimised thereby and manufacturing costs may be reduced owing to the reduced number of components.

The control unit preferably comprises at least two control chambers which are separated from each other by a separating element arranged on the guide element.

The centring unit preferably comprises at least two centring chambers and a centring device. The centring device preferably comprises a stop element arranged on the guide element and a centring element arranged on the steering unit, and on the side facing the centring element respectively each of the centring chambers comprises a displacement element arranged between the steering unit and the guide element.

A steering cylinder tubular body and a steering housing may be constructed in the steering unit, wherein the steering cylinder tubular body is at least partially surrounded by the steering housing. A positioning element may also be arranged on the steering cylinder tubular body the positioning element being displaceably mounted with a bearing unit in such a way that a rotation of the steering cylinder tubular body about its cylinder axis is prevented.

In a second preferred embodiment, the steering unit is slidably mounted on the guide element in a passive manner wherein an external mechanism is provided to move the steering unit. More specifically the system may further comprise a steering drive unit arranged outside of the steering unit, which is coupled to the steering unit and serves to move the steering unit along the guide unit.

The steering drive unit may comprise a converting unit which converts mechanical movement of a steering wheel into mechanical movement of the steering unit. The mechanical output of the converting unit may be combined with an assisting force from a steering assist actuator which is coupled to linkage between the converting unit and the steering unit, wherein control of the actuator is preferably coordinated with the movement of the steering wheel. A mechanical connection between a turn of a steering wheel and the utility vehicle wheels is legally required in multi-axle utility vehicles which have a permissible top speed of more than 62 km/h. Advantageously, to achieve the high steering forces required in utility vehicles the mechanical connection between the steering wheel and the utility vehicle wheels is combined with a hydraulic steering assembly in this manner.

Alternatively, a steering control actuator may be coupled to the steering control unit with no mechanical link between the steering wheel and the steering unit.

Further advantages of the invention will become apparent from the following description of specific embodiments in which.

Figure 1:
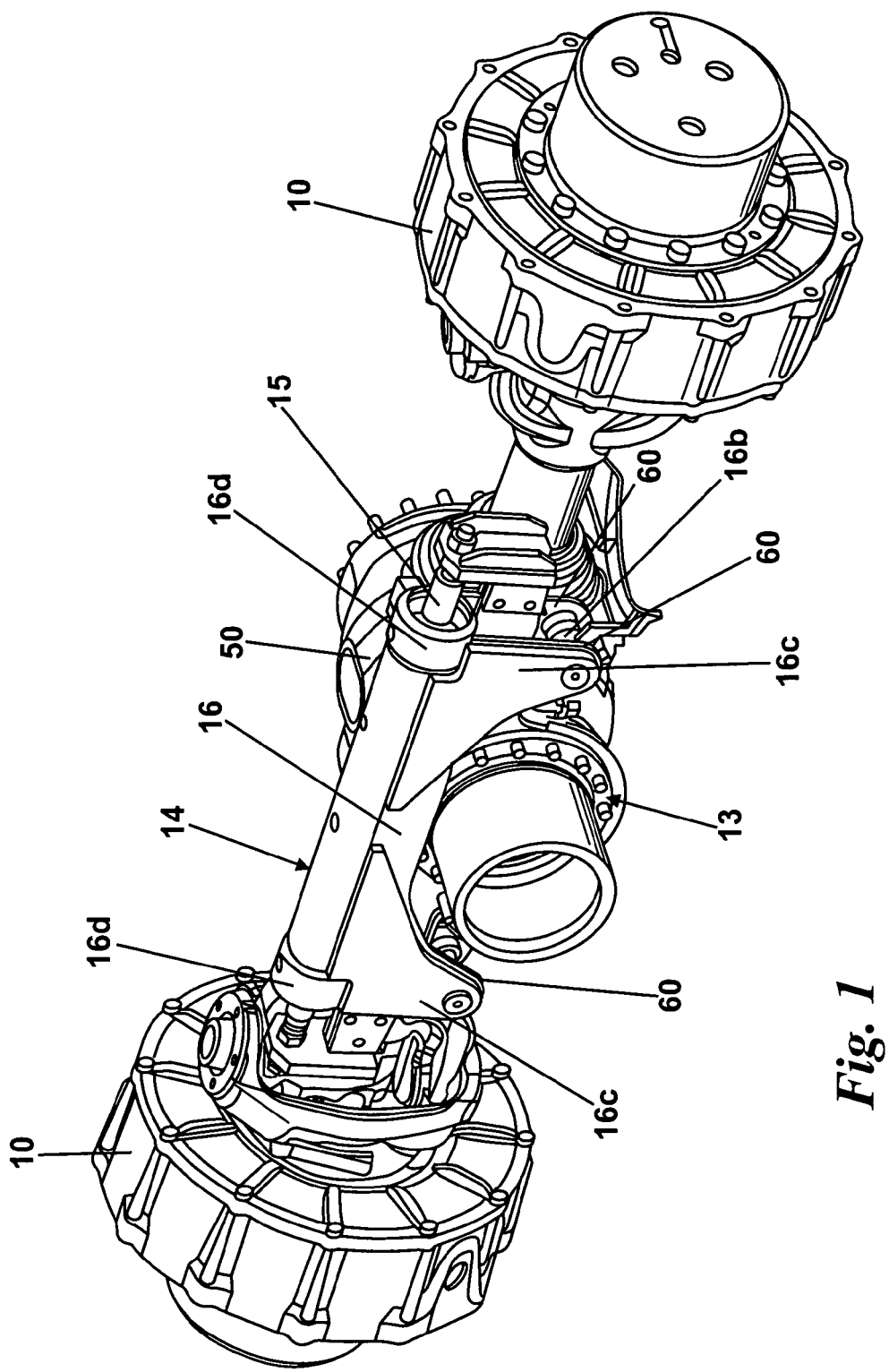
FIG. 1 shows a perspective view of a steering system with a bearing unit and a wheel mounting unit in accordance with a first embodiment of the invention.

FIG. 1 shows a perspective view of a steering system 14 in accordance with a first embodiment of the invention comprising a gear unit 50 and a wheel mounting unit 10. The steering system 14 is coupled by means of a bearing unit 13 to the gear unit 50 in this case.

The steering system 14 is also centrally arranged between two wheel mounting units 10. Utility vehicle wheels (not visible in FIG. 1) are in each case mounted on the wheel mounting units 10. The steering system 14 is in each case also coupled by a steering linkage (not shown in FIG. 1) to the respective wheel mounting unit 10.

The steering linkage is preferably a track rod and a steering arm arranged around a wheel mounting unit 10 respectively. The track rod is coupled at one of its ends to the steering system 14 and at its end remote from the steering system 14 to the steering arm. The steering movements of a steering wheel can therefore be transmitted by means of the steering linkage via the steering system 14 to the wheel mounting unit 10 and thus, for example, the utility vehicle wheels are moved.

In this embodiment the steering system 14 comprises a steering housing 16 and a guide element 15 that penetrates the steering housing 16, the guide element 15 being called the steering cylinder piston rod 15 hereinafter. The steering housing 16 has a U-shaped form both along the steering cylinder piston rod 15 and transversely thereto, so a steering housing 16 with four legs 60 is formed, the individual legs 60 being arranged so as to oppose the steering cylinder piston rod 15. Each leg 60 has a substantially triangular shape. The steering housing 16 is not limited to the U-shaped form in this connection; an L-shaped steering housing 16 for example is also conceivable, depending on the steering forces that occur.

Respective reinforcing elements 16c are also arranged on all legs 60 of the steering housing 16. These reinforcing elements 16c can for example be welded to the steering housing 16 in this case. The reinforcing elements 16c can also be manufactured with the steering housing 16 from a cast part.

A pin 16b also extends between the two legs 60 and is provided for receiving the track rod (not shown). The steering housing 16 is also coupled to the steering cylinder piston rod 15 in such a way that the steering housing 16 can be displaced with respect to the steering cylinder piston rod 15. The steering housing 16 also comprises a respective terminating element 16d at both ends which is securely connected, for example by welding, to the steering housing 16.

Figure 2:
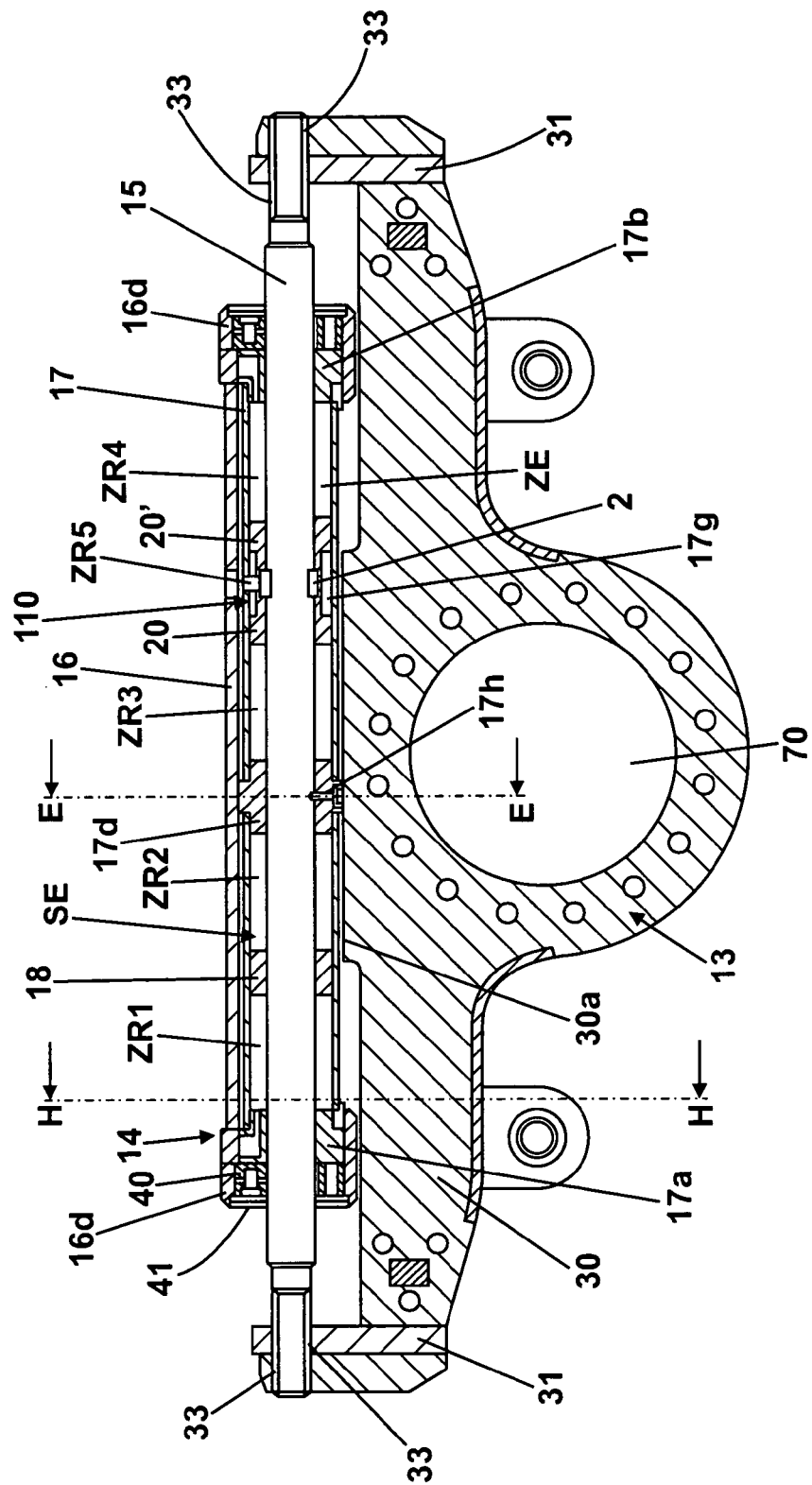
FIG. 2 shows a sectional view of the steering system of FIG. 1 with a gear unit.

FIG. 2 shows a sectional view of the steering system 14 comprising a bearing unit 13. The bearing unit 13 comprises a holding element 30 with a recess 70, the bearing unit 13 being arranged on the gear unit 50 by means of the recess 70. The bearing unit 13 also comprises a respective fixing unit 31 at both ends for fixing the steering cylinder piston rod 15.

At its two ends the steering cylinder piston rod 15 is non-displaceably fixed to the respective fixing unit 31, for example by centring nuts 33. The holding element 30 also has an elevation 30a which is in contact with a positioning element 17h shown in FIG. 3.

The steering system 14 also comprises a steering cylinder tubular body 17 which together with the steering housing 16 forms a steering unit 16, 17. The steering cylinder tubular body 17 is arranged between the steering housing 16 and the steering cylinder piston rod 15. Individual control chambers ZR1, ZR2 that define a control unit SE, and centring chambers ZR3, ZR4 that define a centring unit ZE are also formed between the steering cylinder tubular body 17 and the steering cylinder piston rod 15. A steering system is also conceivable in which there is no steering cylinder tubular body 17 and the control chambers ZR1, ZR2 and the centring chambers ZR3, ZR4 are formed between the steering housing 16 and the steering cylinder piston rod 15.

The steering housing 16 can be displaced in a desired direction by means of the control unit SE by supplying a fluid into a first and/or second control chamber ZR1, ZR2. The utility vehicle is therefore steered solely by way of the control unit SE. The centring unit ZE is used merely to ensure a central starting position of the steering housing 16. The central starting position of the steering housing 16 is ensured by a simultaneous supply of fluid into a third and/or fourth centring chamber ZR3, ZR4 of the centring unit ZE. A steering housing 16 is also conceivable in which just two cylinder chambers are arranged inside the steering housing 16. A combination of a steering unit and mechanical centring of the steering housing 16 is also conceivable.

A leakage chamber ZR5 arranged in the centring unit ZE is used to receive the fluid which flows through seals (not shown in FIG. 2) via the first and/or second displacement element 20, 20' out of the third and/or fourth centring chamber ZR3, ZR4 and into the leakage chamber ZR5.

In this case the first control chamber ZR1 is limited by a first end piece 17a arranged on the steering cylinder tubular body 17 at its one end and at its end remote from the first end piece 17a by a separating element 18, which will hereinafter be called a piston 18, securely arranged on the steering cylinder piston rod 15. The piston 18 separates the first control chamber ZR1 from the second control chamber ZR2.

At the end remote from the piston 18 the second control chamber ZR2 is also separated from the third centring chamber ZR3 by an intermediate element 17d arranged on the steering cylinder tubular body 17. The third centring chamber ZR3 is separated from a fourth centring chamber ZR4 by a centring device 110, the fourth centring chamber ZR4 being limited at the end remote from the centring unit ZE by a second end piece 17b. The second end piece 17b is arranged on the steering cylinder tubular body 17.

The centring device 110 comprises a centring element 17g arranged on the steering cylinder tubular body 17 and a stop element 22 arranged on the steering cylinder piston rod 15. Displaceable first and second displacement elements 20, 20' are also arranged between the steering cylinder tubular body 17 and the steering cylinder piston rod 15 and these are each in contact with the centring element 17g when the utility vehicle wheels are in the unmoved state. Furthermore, the first and second displacement elements are in contact with the stop element 22 when the utility vehicle wheels are in the unmoved state.

The steering cylinder tubular body 17 is fixed on the steering housing 16 in that a fixing means 40, such as an adjusting nut, is guided into an internal thread of the terminating element 16d at the respective end of the steering housing 16. The threads are gripped, so the adjusting nut 40 is secured in position, by tightening a securing screw 41 for example.

Figure 3:
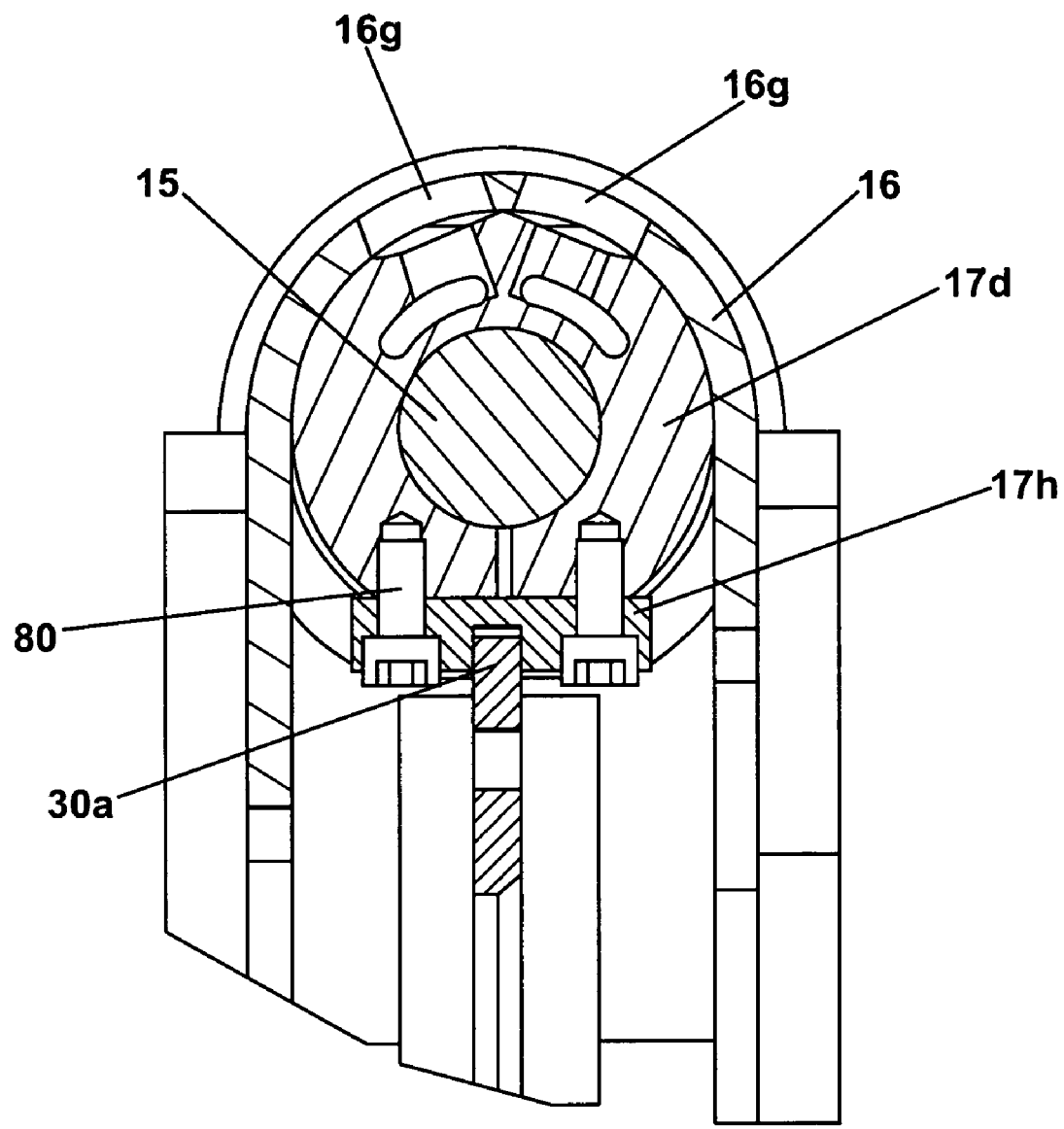
FIG. 3 shows a sectional view, transversely to the steering system of FIG. 1, through a positioning element.

FIG. 3 shows a sectional view, transversely to the steering system 14, through a positioning element 17h.

The positioning element 17h, oriented in the direction of the elevation 30a on the holding element 30, is provided on the intermediate element 17d. This positioning element 17h is securely connected to the intermediate element 17d, for example by screws 80. At its end pointing in the direction of the elevation 30a on the holding element 30 the positioning element 17h also has a groove that is counter-shaped with respect to the elevation 30a and is in contact with the elevation 30a. Rotation of the intermediate element 17d, and therewith of the steering cylinder tubular body 17, is prevented by the contact between the groove of the positioning element 17h and the elevation 30a.

Figure 4:
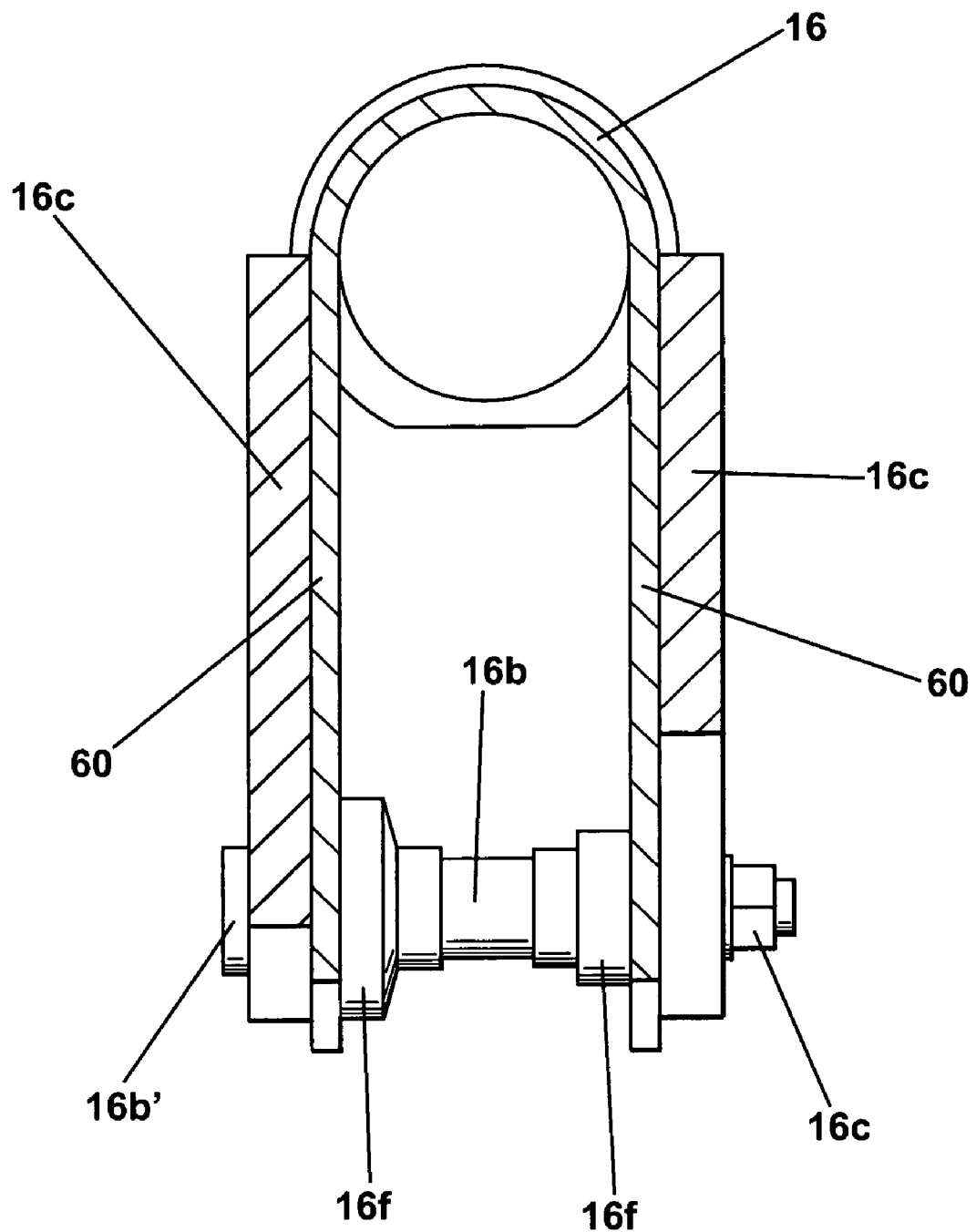
FIG. 4 shows a sectional view, transversely to the steering system of FIG. 1, through a steering housing.

FIG. 4 shows a sectional view, transversely to the steering system, through a steering housing 16. The sectional view shows the section H-H illustrated in FIG. 2 without showing the steering cylinder piston rod 15 and the steering cylinder tubular body 17 (cf. FIG. 2).

The opposing legs 60, relative to the steering cylinder piston rod 15 (not shown), of the steering housing 16 are coupled to a pin 16b. One end (not shown in FIG. 4) of the steering linkage is arranged on the pin 16b and between the two opposing legs 60. The axial position of the steering linkage on the pin 16b can be defined by at least one spacing element 16f such as a centring bush for example.

The pin 16b is also securely arranged between the two legs 60 of the steering housing 16. In this embodiment this takes place in that at one end the pin 16b has a larger pin shoulder 16b' than the corresponding recess in the leg 60 and the end of the pin 16b' remote from the pin shoulder 16b' is fastened for example by a hexagon nut 16e. When the steering housing 16 is displaced along the steering cylinder piston rod 15 the pin 16b, and therewith the steering linkage arranged on the pin 16b, is displaced in the same direction as the steering housing 16. The wheel mounting unit 10 is also swivelled as a result of the displacement of the steering housing 16.

Figure 5:
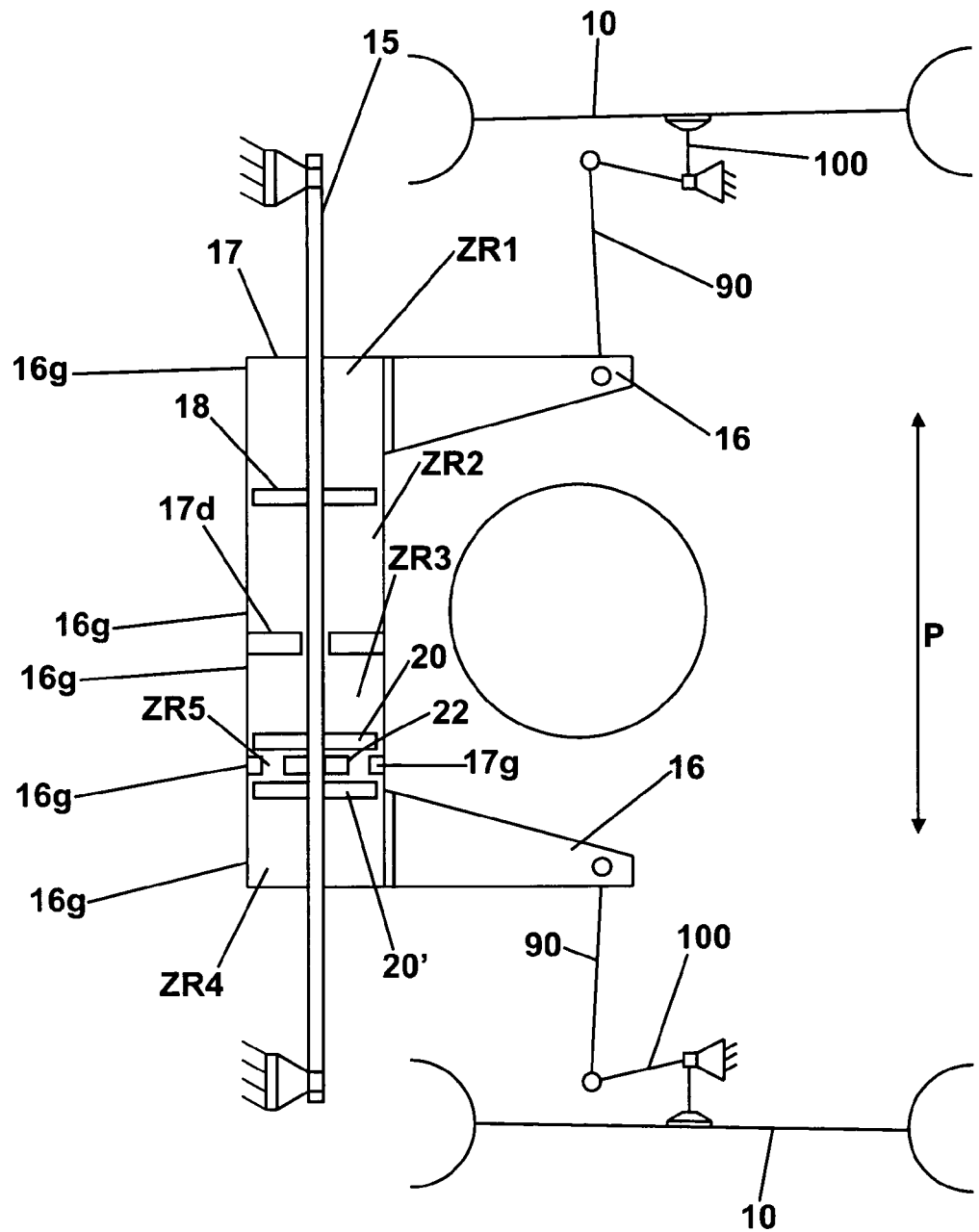
FIG. 5 shows a schematic diagram of the steering system of FIG. 1 in the unmoved state.

FIG. 5 shows a schematic diagram of the steering system in the unmoved state. The steering cylinder tubular body 17 is securely connected to the steering housing 16. The steering linkage, which is composed of a track rod 90 and a steering arm 100, is arranged on the steering housing 16. At one end the track rod 90 is coupled to the steering housing 16 and at the end remote from the steering housing 16 is coupled to the steering arm 100. Furthermore, the steering arm 100 is coupled to a respective wheel mounting unit 10 in such a way that displacement of the steering arm 100 leads to movement of the wheel mounting unit 10. Utility vehicle wheels (not shown in FIG. 5) are mounted on the wheel mounting unit 10.

A fluid can be supplied to and/or removed from the respective control chamber ZR1, ZR2 and/or centring chamber ZR3, ZR4, ZR5 by means of holes 16g, and the steering cylinder tubular body 17 and the steering cylinder housing 16 can therefore be displaced in the direction of arrow P.

Figure 6:
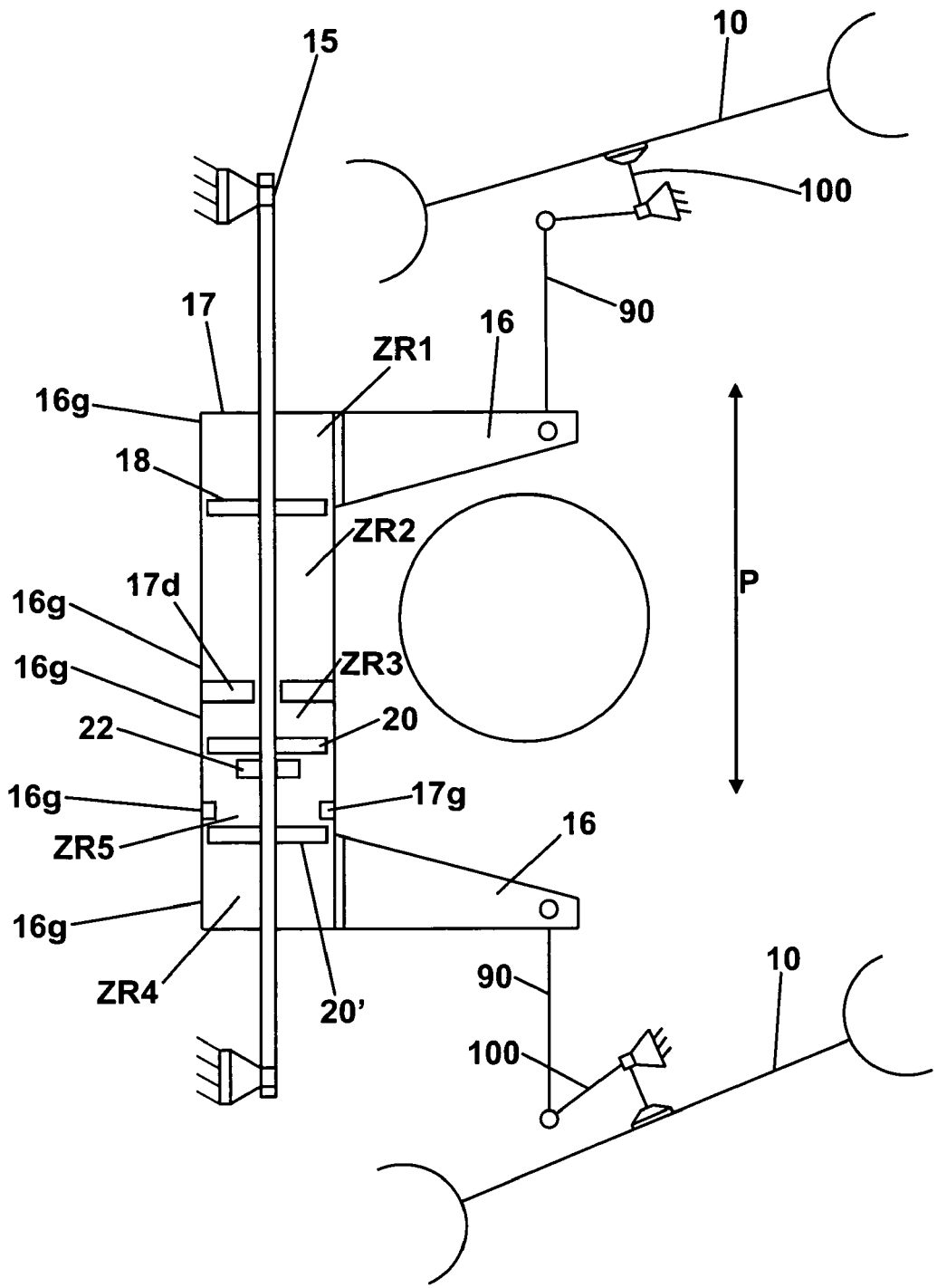
FIG. 6 shows a schematic diagram of the steering system of FIG. 1 in the moved state.

FIG. 6 shows a schematic diagram of the steering system in the moved state. A fluid is supplied by way of example to control chamber ZR2 via the hole 16g in this case.

Owing to the fixed arrangement of the steering cylinder piston rod 17, and therewith the piston 18 arranged on the steering cylinder piston rod, the steering cylinder tubular body 17 has to be displaced in the direction away from the control chamber ZR1 owing to the increased pressure in the control chamber ZR2. The steering housing 16, coupled to the steering cylinder tubular body 17, and therefore the track rod 90, is also displaced in the same direction and at the same time as the steering cylinder tubular body 17.

When the steering cylinder tubular body 17 is moved in the direction away from the control chamber ZR1 the stop element 17g moves the displaceable second displacement element 20' in the same direction as the steering cylinder tubular body 17 and the steering housing 16 is also displaced owing to the coupling of the steering cylinder tubular body 17 to the steering housing in the respective end pieces 16d. The steering movement, and therefore the movement of the wheel mounting unit 10, takes place by way of reciprocal loading of the first and/or second control chamber ZR1, ZR2 with fluid. The centring chambers ZR3, ZR4 are depressurised when fluid is supplied into the first and/or second control chamber ZR1, ZR2 as they are not loaded with fluid, so none of the force acting in the opposite direction to displacement of the steering cylinder tubular body 17 is exerted through the centring chambers ZR3, ZR4.

The steering housing 16 is also axially centred by fluid being simultaneously supplied to the third and fourth centring chambers ZR3, ZR4 respectively. As a result of the consequently elevated pressure in the third and fourth centring chambers ZR3, ZR4 a force is exerted on the first and second displacement elements 20, 20' respectively such that they are each displaced in the direction of the stop element 22 until they each abut against the stop element 22 and the steering housing 16 is axially centred therewith.

Starting from the position shown in FIG. 6 a force is exerted on the steering cylinder tubular body 17 by the second displacement element 20', which is in contact with the centring element 17g, when it moves in the direction of the stop element 22, so the steering cylinder tubular body 17 is displaced in the direction of the stop element 22.

When the steering cylinder tubular body 17 is displaced into the starting position the first and second control chambers ZR1 and ZR2 are depressurised as no fluid is supplied to them, so none of the force acting in the opposite direction to movement of the steering cylinder tubular body 17 is exerted through the first and second control chambers ZR1, ZR2. The steering cylinder tubular body 17 is in its starting position again when the first and second displacement elements 20, 20' are in contact with the stop element 22.

The above described embodiment involves a steering unit 17 with an integrated means of displacing the steering unit relative to the guide shaft 15, namely cylinders actuated by the application of fluid under pressure. In a second embodiment, a steering unit 17 is moved by an external force provided by a mechanical coupling to the steering wheel which is supplemented by a hydraulic cylinder.

Figure 7:
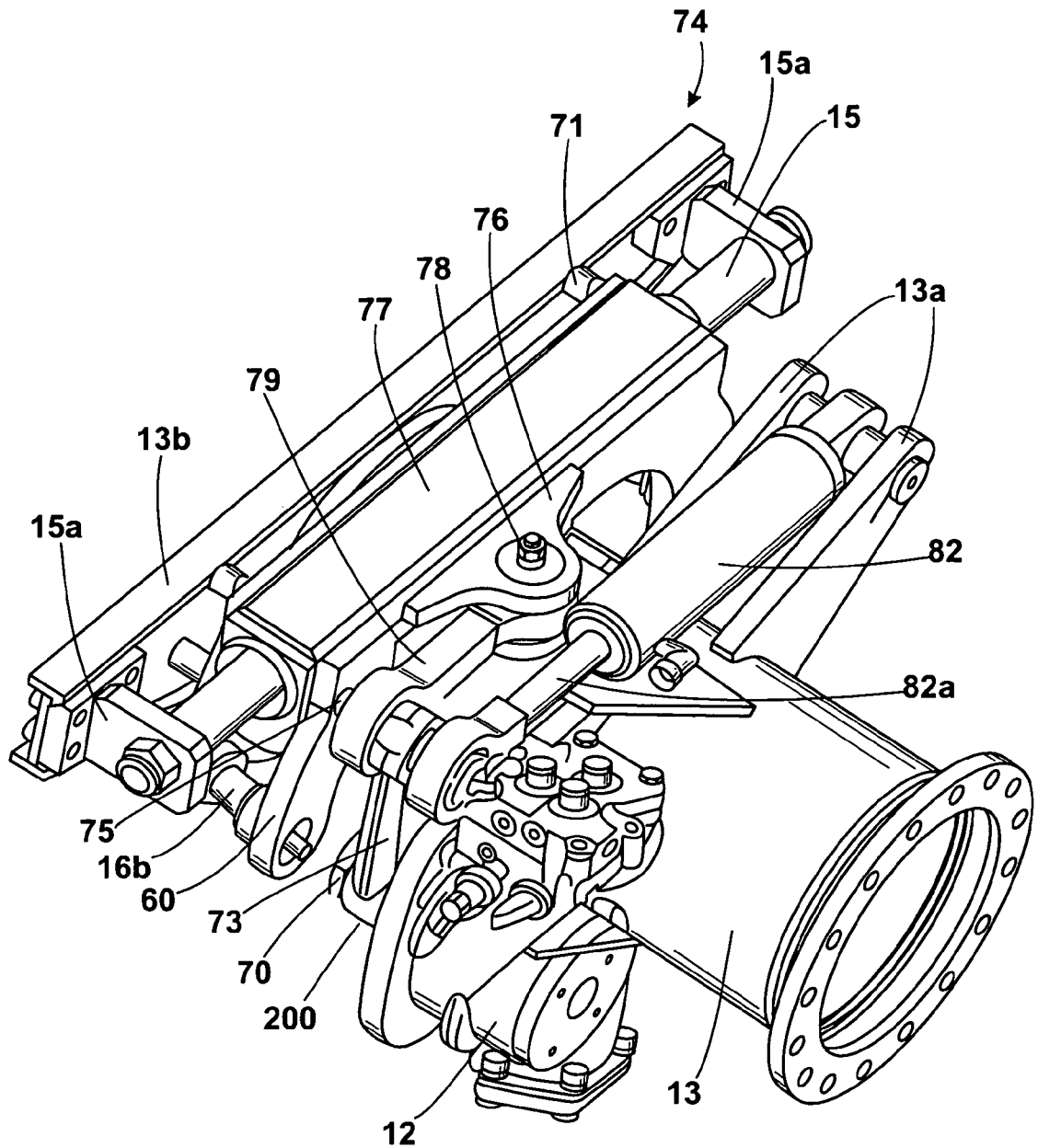
FIG. 7 shows a perspective view of a steering system and a bearing unit in accordance with a second embodiment of the invention.

FIG. 7 shows a perspective view of a steering system 74 and a bearing unit 13. The steering system 74 is arranged on the bearing unit 13, it being possible for the bearing unit 13 to be constructed for example as a gear casing or a frame part. The steering system 74 also comprises a steering drive unit 200, a converting unit 12 and a steering control unit 77.

The steering control unit 77 is displaceably arranged on a guide element 15. The guide element 15 is non-displaceably connected to one fixing unit 15a respectively at its respective ends, the respective fixing unit 15a being coupled to a fastening element 13b constructed as a separate component. This fastening element 13b is also in contact with anti-twist elements 71 arranged on the steering control unit 77 which are each intended to prevent twisting of the steering control unit 77 with respect to the guide element 15.

The steering control unit 77 is also elongate parallel to the guide element 15 and has legs 60 towards its ends. The steering control unit 77 forms a U-shape both along the guide element 15 and transversely to the guide element 15. A pin element 16b extends between the legs 60 that oppose the guide element 15. In a similar manner to the previously described embodiment, a steering linkage (not shown in FIG. 7), by means of which utility vehicle wheels are moved, is coupled to this pin element 16b.

The steering control unit 77 is displaced by means of the steering drive unit 200 as a result of a turn of the steering wheel. The steering drive unit 200 comprises a swivelling element 73 which is coupled at one end to a swivel pin 70 connected to the output-side of the converting unit 12, and at its side remote from the swivel pin 70 is coupled to a connecting element 75. The steering drive unit 200 also comprises a transmitting unit 76 which is coupled to the steering control unit 77. The transmitting unit 76 comprises a pair of brackets in which a pivot bearing 78 is arranged. These brackets are also securely connected to the steering control unit 77, for example by welding.

A push/pull element 79 is coupled at one end to the connecting element 75 and at the end remote from the connecting element 75 is coupled to the transmitting unit 76. The push/pull element 79 and the transmitting unit 76 can be coupled for example to the pivot bearing unit 78 arranged in the transmitting unit 76.

The steering drive unit 200 also comprises an adjusting unit 82 which is coupled by a piston rod 82a to the connecting element 75. The adjusting unit 82 is for example a hydraulic cylinder in this case which assists displacement of the steering control unit 77 via the transmitting unit 76. The adjusting unit 82 is fastened by holding elements 13a to the bearing unit 13. The holding elements 13a are constructed as separate components and are securely connected to the bearing unit 13, for example by welding.

When the steering wheel (not shown) is turned, the turn of the steering wheel is introduced by an input shaft (not shown) into the converting unit 12 and is converted by means of the converting unit 12 into an output-side swivelling movement of the swivelling element 73 about the swivel pin 70. When the swivel element 73 is swivelled the transmitting unit 76 experiences a movement via the push/pull element 79 which is parallel to the guide element 15 and in the same direction as swivelling of the swivel element 73. The steering control unit 77 also experiences a movement in the same direction as the swivelling movement of the swivelling element 73 owing to the coupling of the steering control unit 77 to the transmitting unit 76.

The adjusting unit 82 can support the swivelling movement of the swivel element 73 in the process. The mechanical torque supplied by the steering wheel acts directly on the connecting element 75 via the swivelling element 73. This mechanical torque is superimposed by a further torque which also acts on the connecting element 75 via the piston rod 82a and thus ensures movement of the utility vehicle wheels even in the case of large steering forces.

When a steering movement is introduced into the converting unit 12 fluid is in each case supplied to and/or removed from the adjusting element 82 by an integrated on-off valve (not shown) in such a way that the piston rod 82a moves in the same direction as the swivel element 73 and therewith the steering control unit 77.

Figure 8:
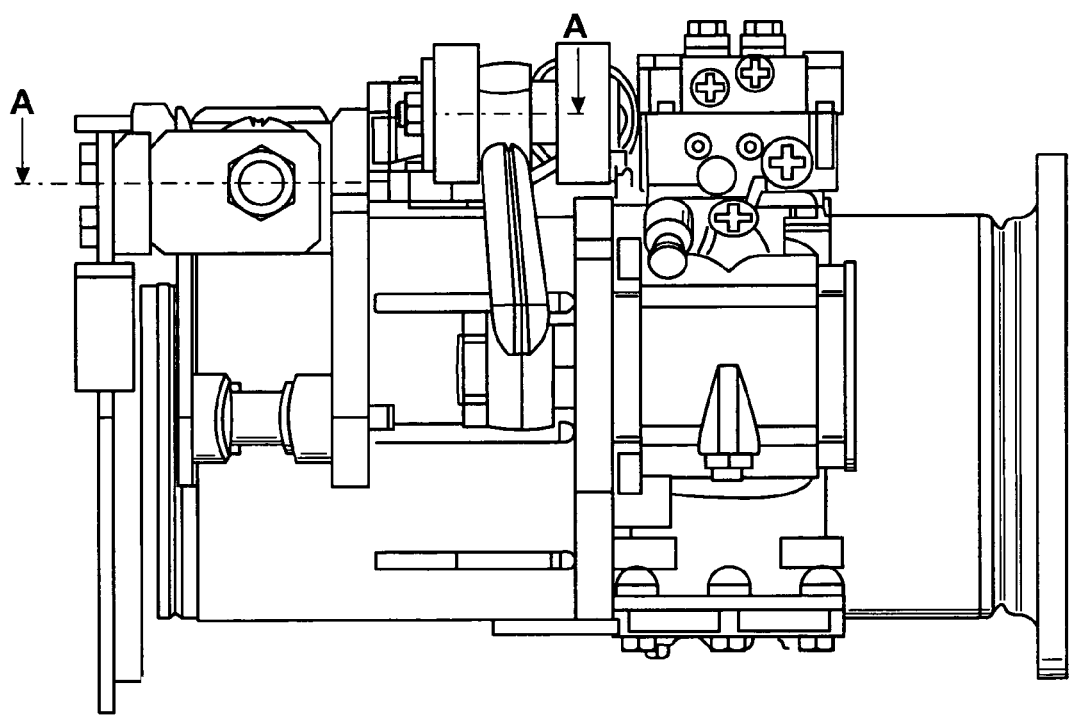
FIG. 8 shows a side view of the steering system and bearing unit of FIG. 7.
Figure 9:
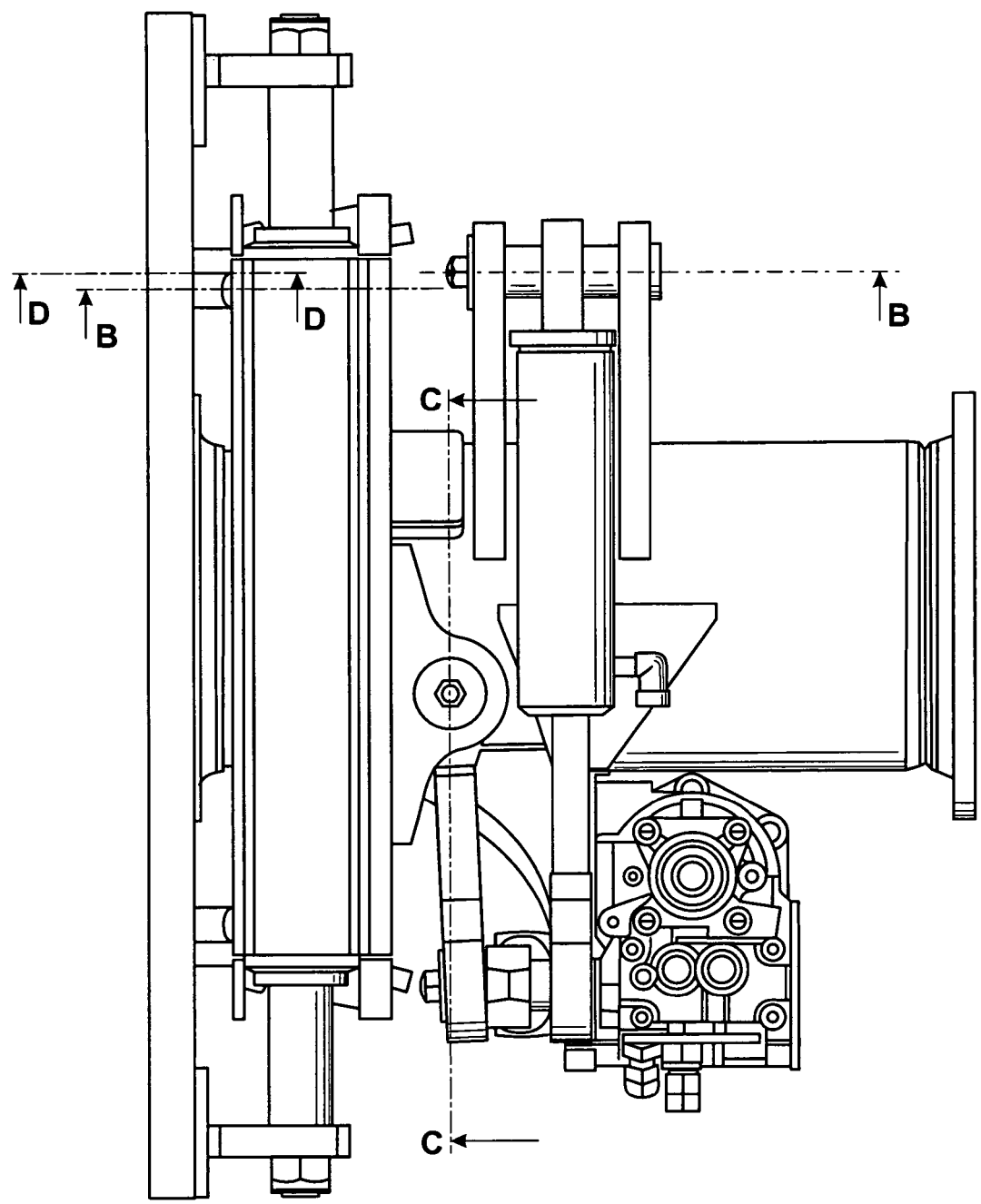
FIG. 9 shows a plan view of the steering system and bearing unit of FIG. 7.
Figure 10:
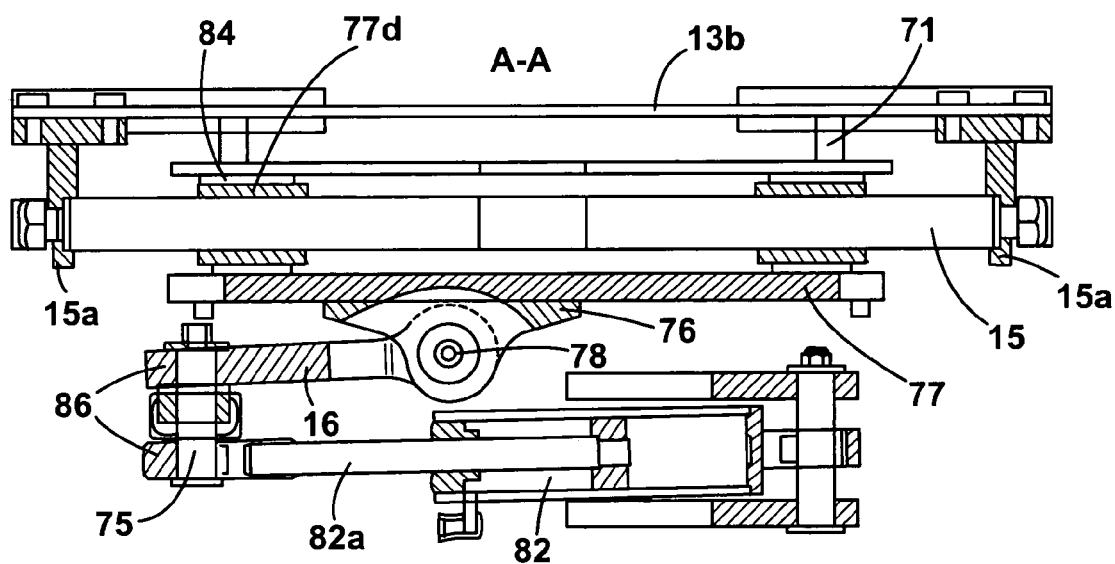
FIG. 10 shows a sectional view of a plan view through parts of a steering drive unit and a steering control unit of the system of FIG. 7.
Figure 11:
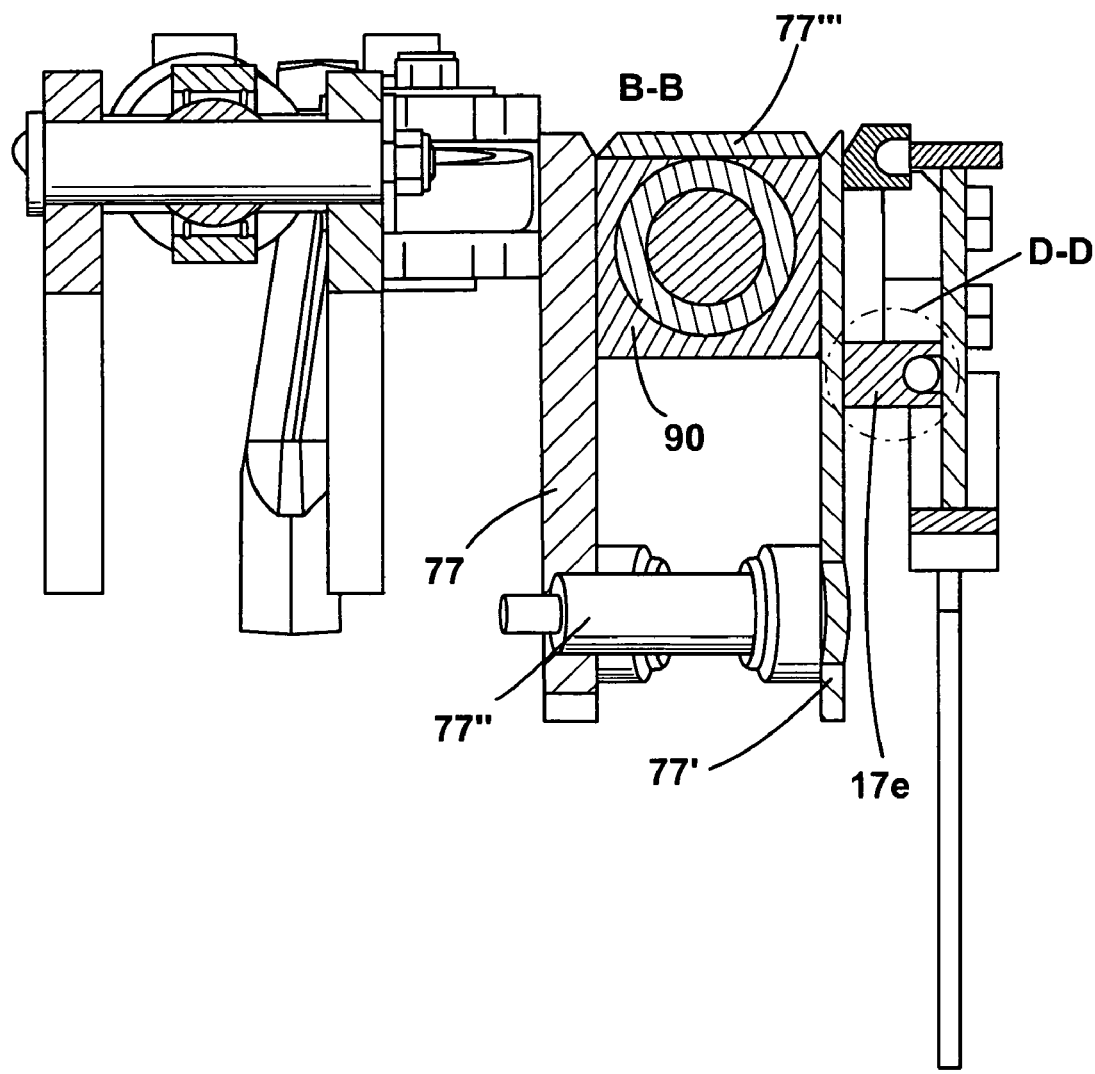
FIG. 11 shows a sectional view through a side view of the steering drive unit and the steering control unit of FIG. 10.
Figure 12:
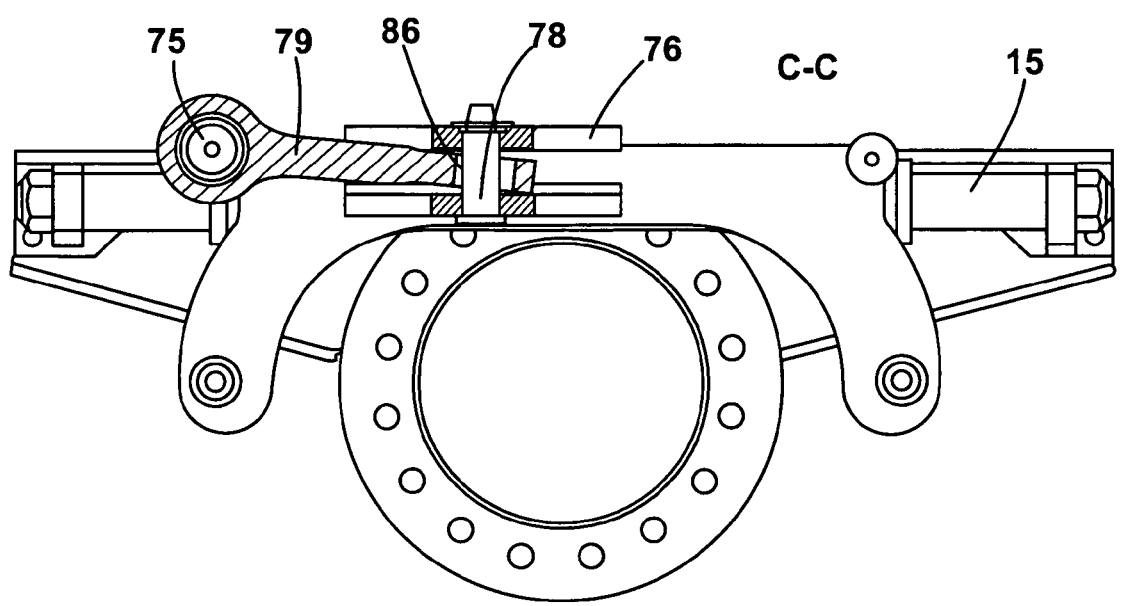
FIG. 12 shows a sectional view of mounting of a transmitting unit coupled to the steering control unit of FIG. 10.

FIG. 8 and FIG. 9 serve merely to illustrate the course of the section in FIG. 10 to 12. FIG. 8 shows a side view of a steering system and a bearing unit and FIG. 9 shows the plan view of a steering system and a bearing unit.

FIG. 10 shows a sectional view of a plan view through parts of a steering drive unit and steering control unit 77 along the section line A-A shown in FIG. 8. The steering control unit 77 is mounted on the guide unit 15 for example by linear ball bearings and/or sliding bearings 77d. The transmitting unit 76 coupled to the steering control unit 77 allows the displacement caused by the swivelling element 73 and/or the piston rod 82a to be transmitted to the steering control unit 77 by means of these linear ball bearings and/or sliding bearings 77d.

The linear ball bearings or sliding bearings 77d are in contact with a reinforcing element 84 which surrounds them. The reinforcing element 84 is also securely connected to the steering control unit 77, for example by welding, and is therefore used to increase the rigidity of the steering control unit 77.

The push/pull element 79 and/or the piston rod 82a is/are also mounted on the connecting element 75 by means of one bearing element 86 respectively. The respective bearing element 86 allows certain angular deviations in arrangement and during the progression of movement of the push/pull element 79 and/or the piston rod 82a with respect to the connecting element 75, whereby tolerance deviations inter alia are compensated when the components are assembled.

FIG. 11 shows a sectional view through a side view of a steering drive unit and a steering control unit 77 along the section lines B-B and D-D shown in FIG. 9. The steering control unit 77 is substantially U-shaped. Consequently the steering control unit 77 is composed of a steering control unit upper part 77''' and two opposing legs 77', 77''. The legs 77', 77'' can also have different wall thicknesses. Thus in this case the first leg 77' facing the fastening element 13b has a thinner wall thickness than the second leg 77'' facing the steering drive unit.

Additional reinforcing elements (not shown) for reinforcing the steering control unit can also be used between the steering control unit upper part 77''' and the individual legs 77', 77''. Twisting of the steering control unit 77 with respect to the guide element 15 can also be avoided by means of the anti-twist elements 71 provided on the first leg 77', which at the end remote from the leg 77' are in contact with the holding element.

FIG. 12 shows a sectional view along the section line C-C shown in FIG. 9 of mounting of a transmitting unit 76 coupled to a steering control unit 77. The push/pull element 79 is mounted at one end in the pivot bearing unit 78 of the transmitting unit 76 with the same bearing element 86 as it is mounted at its end remote from the pivot bearing unit 78 in the connecting element 75.

The bearing element 86 is selected such that the angular deviation permitted by the bearing element 86 substantially tallies with the maximum spacing between two swivel element positions through which the swivel element 73 passes during swivelling along a circular path caused by the converting unit 12.

Although the aforementioned embodiment comprises a converting unit 12 for transmitting mechanical force from the steering wheel, it is envisaged that the steering system may be totally hydraulic especially for utility vehicles operating at speeds below 62 km/h. In this case, a tuning movement of the steering wheel may be sensed and converted to an electrical signal which is then converted to a hydraulic signal to actuate a hydraulic cylinder with no direct mechanical linkage involved.

Also, a utility vehicle may comprise a steering system according to the invention for each of its steerable wheels.

The invention claimed is:

1. A steering system, comprising a steering unit (16, 17;77) through which a guide element (15) extends, wherein the guide element (15) is fixed in position relative to a frame of a vehicle and the steering unit (16, 17;77) can be displaced along the guide element, wherein the steering unit (16, 17;77) can be coupled to utility vehicle wheels via a steering linkage and wherein the steering unit (16, 17) comprises a centring unit (ZE) and a control unit (SE), wherein the centring unit (ZE) and the control unit (SE) are separated by an intermediate element (17*d*) fastened to the steering unit (16, 17), and the steering unit (16, 17) can be displaced in response to a quantity of fluid supplied into the centring unit (ZE) and/or control unit (SE).

2. A steering system according to claim 1, wherein the steering unit (16, 17;77) is elongate and comprises legs (60) toward its longitudinal ends.

3. A steering system according to claim 2, wherein a reinforcing element (16*c*) is arranged on each leg (60).

4. A steering system according to claim 2, wherein the leg (60) or the reinforcing element (16*c*) is substantially triangular.

5. A steering system according to claim 2, wherein the steering linkage is coupled to a leg (60) by a pin (16*b*).

6. A steering system according to claim 1, wherein the steering unit (16, 17;77) is L-shaped transversely to the guide element (15).

7. A steering system according to claim 5, wherein transversely to the guide element (15) the steering unit (16, 17;77) comprises two opposing legs (60;17',17") respectively and encloses the guide element (15) in a U-shape, and the axial position of the steering linkage on the pin (16*b*) can be adjusted by means of a centring bush (16*l*).

8. A steering system according to claim 1, wherein the guide element (15) is a shaft which extends transversely with respect to direction of travel of the vehicle.

9. A steering system according to claim 1, wherein the steering unit (16, 17) comprises two cylinder chambers, wherein the steering unit (16, 17) is displaced in response to fluid supplied into the cylinder chambers.

10. A steering system according to claim 1, wherein the control unit (SE) comprises at least two control chambers (ZR1, ZR2) which are separated from each other by a separating element (18) arranged on the guide element (15).

11. A steering system according to claim 1, wherein the centring unit (ZE) comprises at least two centring chambers (ZR3, ZR4) and a centring device (110).

12. A steering system according to claim 11, wherein the centring device (110) comprises a stop element (22) arranged on the guide element (15) and a centring element (17*g*) arranged on the steering unit (16, 17), and on the side facing the centring element (17*g*) respectively each of the centring chambers (ZR3, ZR4) comprises a displacement element (20, 20') arranged between the steering unit (16, 17) and the guide element (15).

13. A steering system according to claim 11, wherein the respective control chamber (ZR1, ZR2) and/or the respective centring chamber (ZR3, ZR4) comprises at least one hole (16*g*) for supplying and/or removing a fluid.

14. A steering system according to claim 1, wherein a steering cylinder tubular body (17) and a steering housing (16) is constructed in the steering unit (16, 17), wherein the steering cylinder tubular body (17) is at least partially surrounded by the steering housing (16).

15. A steering system according to claim 14, wherein a positioning element (17*h*) is arranged on the steering cylinder tubular body (17) and is displaceably mounted with a bearing unit (13) in such a way that a rotation of the steering cylinder tubular body (17) about its cylinder axis is prevented.

* * * * *